(12) United States Patent
Jiang et al.

(10) Patent No.: US 8,064,546 B2
(45) Date of Patent: Nov. 22, 2011

(54) RANDOM ACCESS PREAMBLE DETECTION FOR LONG TERM EVOLUTION WIRELESS NETWORKS

(75) Inventors: Jing Jiang, Allen, TX (US); Tarik Muharemovic, Dallas, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 813 days.

(21) Appl. No.: 12/139,814

(22) Filed: Jun. 16, 2008

(65) Prior Publication Data

US 2009/0040918 A1 Feb. 12, 2009

Related U.S. Application Data

(60) Provisional application No. 60/943,883, filed on Jun. 14, 2007.

(51) Int. Cl.
*H04L 27/06* (2006.01)
*H04L 1/02* (2006.01)

(52) U.S. Cl. ........................... 375/340; 375/347

(58) Field of Classification Search .......... 375/147–150, 375/260, 262, 324, 335, 340, 342, 355, 357, 375/362–368, 441, 316, 347; 329/347, 358; 340/3.21; 370/438, 439, 443, 447, 461, 503, 370/509–515
See application file for complete search history.

(56) References Cited

U.S. PATENT DOCUMENTS

| | | | | |
|---|---|---|---|---|
| 7,738,889 B2 * | 6/2010 | Nakada | ........................ | 455/506 |
| 8,014,483 B2 * | 9/2011 | Eng et al. | ...................... | 375/360 |
| 2003/0161416 A1 * | 8/2003 | Meyer et al. | .................. | 375/343 |
| 2005/0047530 A1 * | 3/2005 | Lee et al. | ...................... | 375/343 |
| 2005/0063297 A1 * | 3/2005 | Sakata et al. | .................. | 370/208 |
| 2005/0105505 A1 * | 5/2005 | Fishler et al. | ................. | 370/349 |
| 2005/0254604 A1 * | 11/2005 | MacMullan et al. | .......... | 375/340 |
| 2006/0269024 A1 * | 11/2006 | Dominique et al. | .......... | 375/350 |
| 2007/0152761 A1 * | 7/2007 | Kim et al. | ........................ | 331/16 |
| 2007/0171889 A1 * | 7/2007 | Kwon et al. | .................. | 370/350 |
| 2007/0183370 A1 * | 8/2007 | Wallace et al. | ................. | 370/333 |
| 2007/0230600 A1 * | 10/2007 | Bertrand et al. | .............. | 375/260 |
| 2008/0207196 A1 * | 8/2008 | Pettersson | ...................... | 455/424 |
| 2009/0196270 A1 * | 8/2009 | Iwai et al. | ...................... | 370/342 |
| 2009/0225707 A1 * | 9/2009 | Baldemair et al. | ............. | 370/329 |

OTHER PUBLICATIONS

Amirijono et al., On Self-Optimization of the Random Access Procedure in 3G Long Term Evolution, 2009, Integrated Network Management-Workshops, 2009. IM '09. IFIP/IEEE Internaional Symposium on, pp. 177-184.*

Kishiyama et al., Investgations on Random Access Channel Structure in Evolve UTRA, Wireless Communication Systems, 2006. iswcs '06. 3rd International Symposium on, 2006, pp. 287-291.*

(Continued)

*Primary Examiner* — Tesfaldet Bocure
*Assistant Examiner* — Lawrence Williams
(74) *Attorney, Agent, or Firm* — Robert D. Marshall, Jr.; W. James Brady; Frederick J. Telecky, Jr.

(57) ABSTRACT

This invention is a method for preamble detection with estimation of UE timing advance (TA) and channel quality information (CQI) which uses a sliding window to detect the preamble and estimate user timing advance and channel quality information. The window length is set to the cyclic prefix length of data transmission. A preamble detection threshold is computed semi-analytically according to noise sample statistics.

13 Claims, 4 Drawing Sheets

OTHER PUBLICATIONS

Lizuka et al, Efficient Random Access Channel Transmission Method Utilizing Soft-Combining of Retransmitted Message Packets According to QoS, 2002, Communication System, 2002. ICCS 2002. The 8th International Conference on, vol. 1, pp. 441-445.*

Wen et al., CAZAC Sequence and Its Application in LTE Random Access, 2006, Information Theory Workshop, 2006. ITW '06 Punta del Este. IEEE, pp. 544-547.*

* cited by examiner

RANDOM ACCESS PREAMBLE DETECTION FOR LONG TERM EVOLUTION WIRELESS NETWORKS

CLAIM OF PRIORITY

This application claims priority under 35 U.S.C. 119(e)(1) to U.S. Provisional Application No. 60/943,883 filed Jun. 14, 2007.

TECHNICAL FIELD OF THE INVENTION

The technical field of this invention is random access preamble detection for initial access, handover and data arrival in a network.

BACKGROUND OF THE INVENTION

In long term evolution (LTE) wireless networks, random access procedure is used for the events including: initial access of a user equipment (UE) into a network; handover of a UE from one base station (Node B) to another base station; arrival of uplink for an uplink non-synchronized UE; arrival of downlink data for an uplink non-synchronized UE; and when there is no dedicated scheduling request channel available. Depending on whether contention is involved, random access procedure is classified into contention based and non-contention based. Contention based random access is applicable for all the events listed above. Non-contention based is only applicable to handover and downlink data arrival. In both cases, random access is based on the transmission of a random access preamble on a random access channel (RACH) by an accessing UE. This allows Node B to estimate, and if needed, adjust the UE transmission time to within a cyclic prefix.

SUMMARY OF THE INVENTION

This invention is a method for preamble detection with estimation of UE timing advance (TA) and channel quality information (CQI).

This invention uses a sliding window to detect the preamble and estimate user timing advance and channel quality information. The window length is set to the cyclic prefix length of data transmission. A preamble detection threshold is computed semi-analytically according to noise sample statistics.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
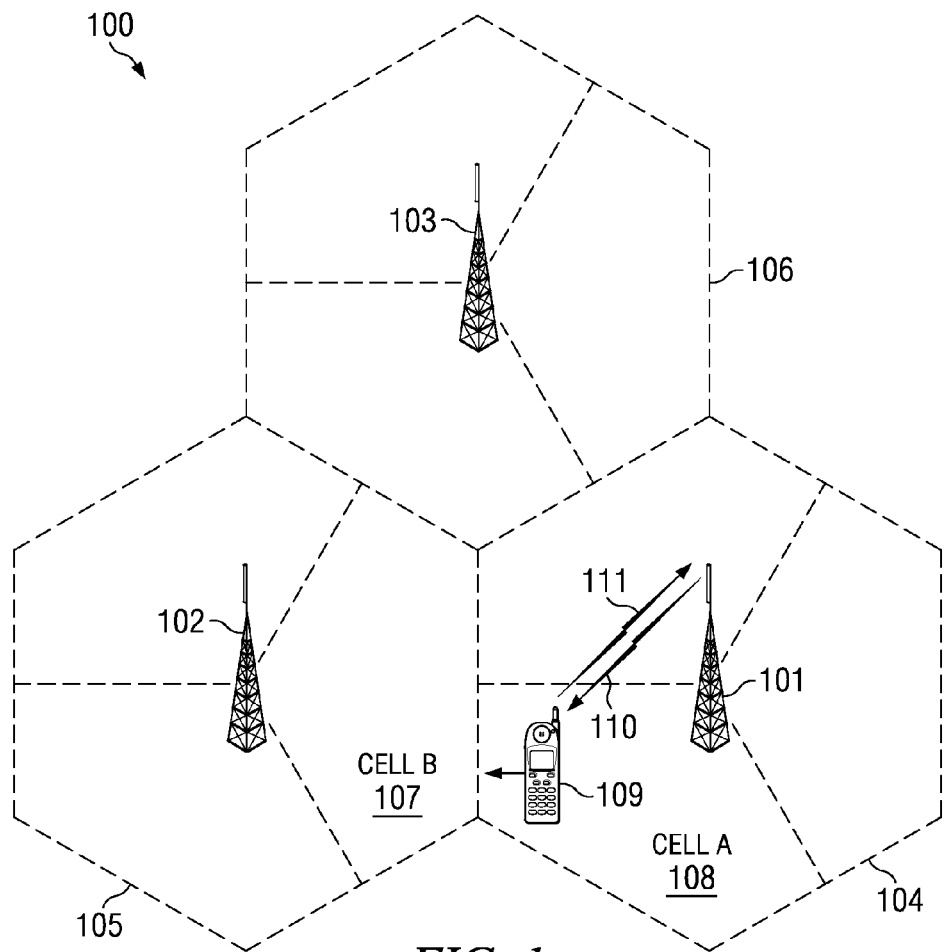
FIG. 1 is a diagram of a communication system of the present invention having three cells.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Figure 2:
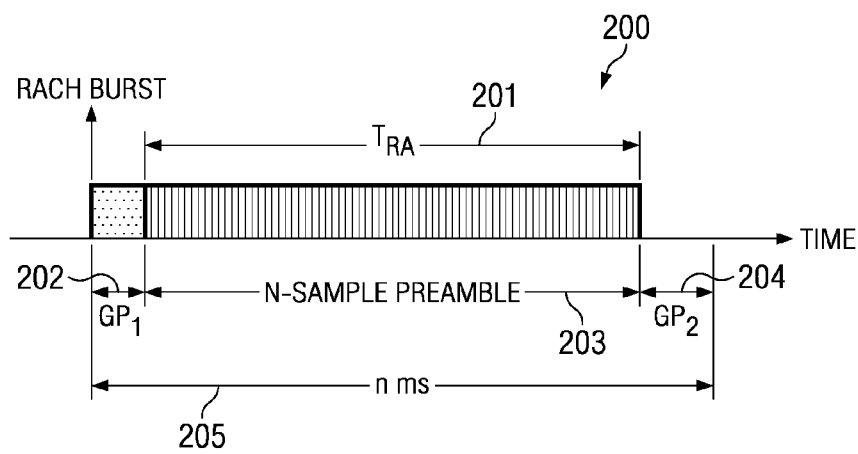
FIG. 2 illustrates a preamble-based RACH slot structure as known in the art.

This invention assumes a preamble-based RACH slot structure as shown in FIG. 2. The preamble is sent over a specified time-frequency resource with a certain period $T_{RA}$ 201. Within each slot, a first guard period $GP_1$ 202 is reserved at the beginning and a second guard period $GP_2$ 204 is reserved at the end. These guard periods maintain time orthogonality between adjacent slots. In the case of synchronized UE, the second guard period $GP_2$ 204 can be omitted due to synchronized uplink transmission time.

The LTE standard calls for Zadoff-Chu (ZC) sequences of prime length. Such sequences possess ideal periodic autocorrelation and optimum periodic cross-correlation. Because ZC sequences are constant amplitude and zero autocorrelation (CAZAC) sequences, they are low in PAPR. The preamble can be a single ZC sequence or a concatenation of repeated sequences. In either case, the sequence used can be a root ZC sequence or a cyclic shifted version of a root ZC sequence. FIG. 2 shows a RACH slot of duration n milliseconds 205 with an N-sample sequence 203 of $T_{RA}$ long.

Figure 3:
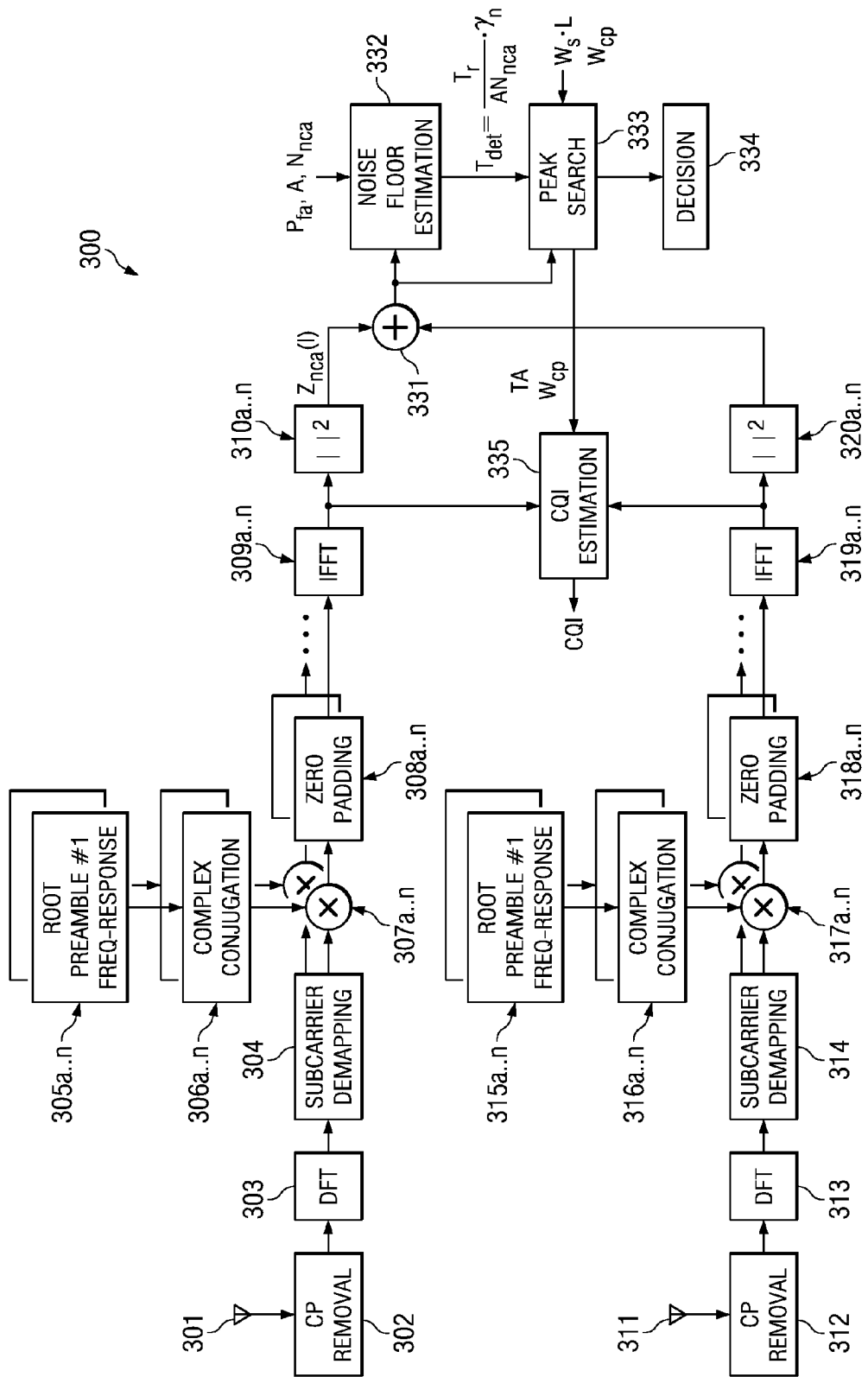
FIG. 3 illustrates a block diagram of an exemplary implementation of preamble detector with two root preambles of this invention.

FIG. 3 illustrates a frequency-domain implementation of preamble detector with two root preambles of this invention. The radio frequency signal is received via two antennas 301, 311. After cyclic prefix (CP) removal (302, 312), a discrete Fourier transform (DFT) (303, 313) of size either the entire preamble length or its constituent sequence length is performed depending on whether coherent or non-coherent accumulation is used. A sub-carrier de-mapper (304, 314) extracts the sub-carriers used by preambles in frequency domain. In the frequency-domain implementation, one preamble detector can be used to detect all signatures based on one root preamble sequence.

At Node B, the received signal is correlated with all available root preamble sequences to detect UE access requests. Each available root preamble sequence includes a corresponding root preamble frequency response (305a to 305n, 315a to 315n). Each root preamble sequence is subject to a complex conjugation (306a to 306n, 316a to 316n). Plural multipliers 307a to 307n, 317a to 317n) multiply subcarrier-by-subcarrier the results of the subcarrier demapping (304, 314) with the complex conjugation 306a to 306n, 316a to 316n) of the root preamble frequency response (305a to 305n, 315a to 315n).

A basic RACH preamble detection algorithm uses power sample-based processing comparing each power sample with a preamble detection threshold. Node B declares corresponding detected signatures and estimates associated UE delays for any power samples exceeding the detection threshold. This invention generalizes the sample-based preamble detection using a sliding window of data CP duration. Instead of each power sample, the received preamble energy within the sliding window is compared with a preamble detection threshold defined as:

$$T_{det} = \frac{T_r}{AN_{nca}} \cdot \gamma_n \quad (1)$$

where: $T_{det}$ and $T_r/AN_{nca}$ are the respective absolute and relative preamble detection thresholds; A is the number of receive antennas: $N_{nca}$ is the number of non-coherent accumulations; and $\gamma_n$ is the noise floor estimate. The sample-based approach can be viewed as a special case of sliding window based approach with a sliding window of one sample. In this invention the window can be the result of a windowing filter such as a unit impulse window filter, a rectangular window filter, a triangular window filter, a Hamming window filter, a Hann window filter, a cosine window filter, a Lanczos window filter, a Bartlett window filter, a Gauss window filter, a Bartlett-Hann window filter, a Blackman window filter or a Kaiser window filter. Filter taps of the window filter may be computed adaptively.

To reduce the implementation complexity of preamble detector, this invention up-samples the preamble by padding zeros (308a to 308n, 318a to 318n) in the frequency domain such that the size of inverse fast Fourier transform (IFFT) is a power of 2 and the preamble up-sampling ratio L strikes a balance between detection performance and implementation complexity. For example, a preamble sequence length of 839 will lead to an IFFT size of 1024 with a fractional preamble up-sampling ratio of 1024/839. The thus zero padded data is inverse fast Fourier transformed (309a to 309b, 319a to 319n). Next block 310a to 310n and 320a to 320n form the square of the absolute value of the now time-domain data. Summer 331 sums the resultant signals.

Note that in FIG. 3, both the noise floor estimation 332 and peak search 333 are performed in time domain. Thus these two operations can also be applied to a time-domain implementation of preamble detection.

The preamble detection threshold is derived assuming a predefined false alarm probability when no preamble is transmitted. With a sliding window based preamble detection, the preamble detection threshold is a straightforward extension of the single sample case with a sliding window length of $W_{cp}$>L samples.

Noise floor estimation 332 operates as follows from inputs $P_{fa}$, A and $N_{nca}$ and the summed data from summer 331. Assuming power accumulation with soft combining over multiple receive antennas at Node B and defining $T_r/AN_{nca}$ as a relative preamble detection threshold satisfying:

$$P_{sfa} = 1 - G_{soft}(T_r)^{W_s L} \quad (2)$$

for a single-signature false-alarm rate $P_{sfa}$, where: $W_s$ is the cyclic shift of a preamble signature at base preamble sampling rate; and L the preamble up-sampling ratio. The value of $W_s$ also represents the time-domain search window size for each individual preamble signature at the corresponding root sequence correlator output. The single-signature false alarm rate $P_{sfa}$ is computed as:

$$P_{sfa} = 1 - (1 - P_{fa})^{1/S} \quad (3)$$

for a predefined total false alarm rate $P_{fa}$ of S signatures per random access channel. Finally, the function $G_{soft}(T_r)$ is the cumulative distribution function (CDF) of a central chi-square random variable with $2AN_{nca}W_{cp}$ degrees of freedom, given by:

$$G_{soft}(T_r) = 1 - e^{-T_r} \sum_{k=0}^{AN_{nca}W_{cp}-1} \frac{1}{k!} T_r^k \quad (4)$$

for the noise power samples after soft combining. The preamble detection threshold then can be computed from equations (1). In real systems, the relative preamble detection threshold $T_r/AN_{nca}$ can be pre-computed and stored at Node B.

This derivation assumes that the noise samples at each correlator output are independent Gaussian. This assumption holds only when the preamble up-sampling ratio L is 1. In practice, a low preamble up-sampling ratio can be used to maintain a low correlation of noise samples. Thus if L<2 the above derivation constitutes a close approximation as confirmed through simulations. The preamble detection threshold is then directly dependent upon the accuracy of noise floor estimate.

Assuming power accumulation and soft antenna combing, the noise power samples $z_{nca}(i)$ at the input to noise floor estimation follow a central chi-square distribution with $2AN_{nca}$ degrees of freedom as shown above. The relative detection threshold for noise floor estimation is set as $Y_r/(AN_{nca})$ such that:

$$F_{soft}(Y_r) = 1 - P_{fa} \quad (5)$$

for a predefined total false alarm rate $P_{fa}$. The term $F_{soft}(Y_r)$ is the cumulative distribution function (CDF) of a central chi-square random variable with $2AN_{nca}$ degrees of freedom given by:

$$F_{soft}(Y_r) = 1 - e^{-Y_r} \sum_{k=0}^{AN_{nca}-1} \frac{1}{k!} Y_r^k. \quad (6)$$

The absolute noise floor threshold can be estimated from:

$$T_n = \frac{F_{soft}^{-1}(1 - p_{fa})}{AN_{nca}} \cdot \frac{1}{N_{ca}} \sum_{i=1}^{N_{ca}} z_{nca}(i) \quad (7)$$

where: $N_{ca}$ is the length of coherent accumulation, i.e., the size of the inverse fast Fourier transform (IFFT) in FIG. 3. The noise floor can then be estimated by:

$$\gamma_n = \frac{1}{N_s} \sum_{\substack{i=1, \\ z_{nca}(i)<T_n}}^{N_{ca}} z_{nca}(i) \quad (8)$$

where: the summation is over all samples less than the absolute noise floor threshold; and $N_s$ is the number of such samples. Simulations confirm the noise floor estimate in equation (8) is also a good approximation for preamble upsampling ratio below 2.

Like the relative preamble detection threshold, the relative noise floor threshold can be pre-computed without the knowledge of actual input noise variance. This calculation is highly consistent and of low complexity. The determination of noise floor and hence preamble detection threshold, is very efficient via simple averaging. In addition, there are no additional signature resources or extra signaling required for this method.

Figure 4:
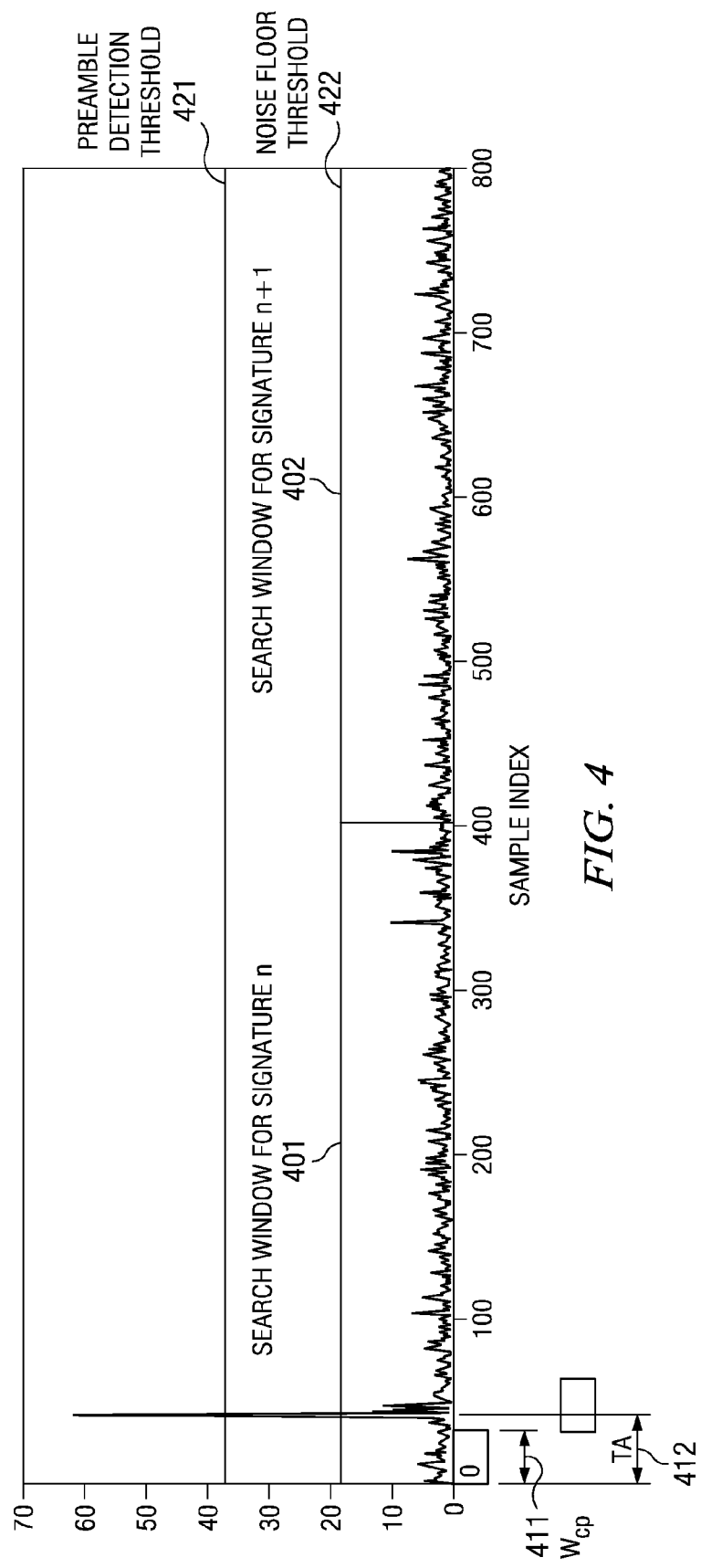
FIG. 4 illustrates a snapshot of received signal power samples spanning two search windows in the time domain.

Preamble detection is based on a sliding window of width $W_{cp}$ in each signature search window of the cyclic shift duration for each root preamble sequence. A signature is detected when the energy in sliding window exceeds preamble detection threshold. FIG. 4 illustrates the peak search 333 process with both preamble detection threshold 421 and noise floor threshold 422. Peak search 333 receives the noise floor estimate from noise floor estimation 332, the processed data signal from summer 331 and the values $W_s$, L and $W_{cp}$. Peak search 333 supplies data on detected peaks to decision 334 for preamble detection when a peak exceeds the preamble detection threshold.

CQI estimation 335 estimates the channel quality information. CQI estimation 335 receives the outputs of respective inverse fast Fourier transforms 309 and 319. CQI estimation 335 also receives a timing advance (TA) signal and sliding window of width $W_{cp}$ from peak search 333. CQI estimation 335 is illustrated in further detail in FIG. 5.

Figure 5:
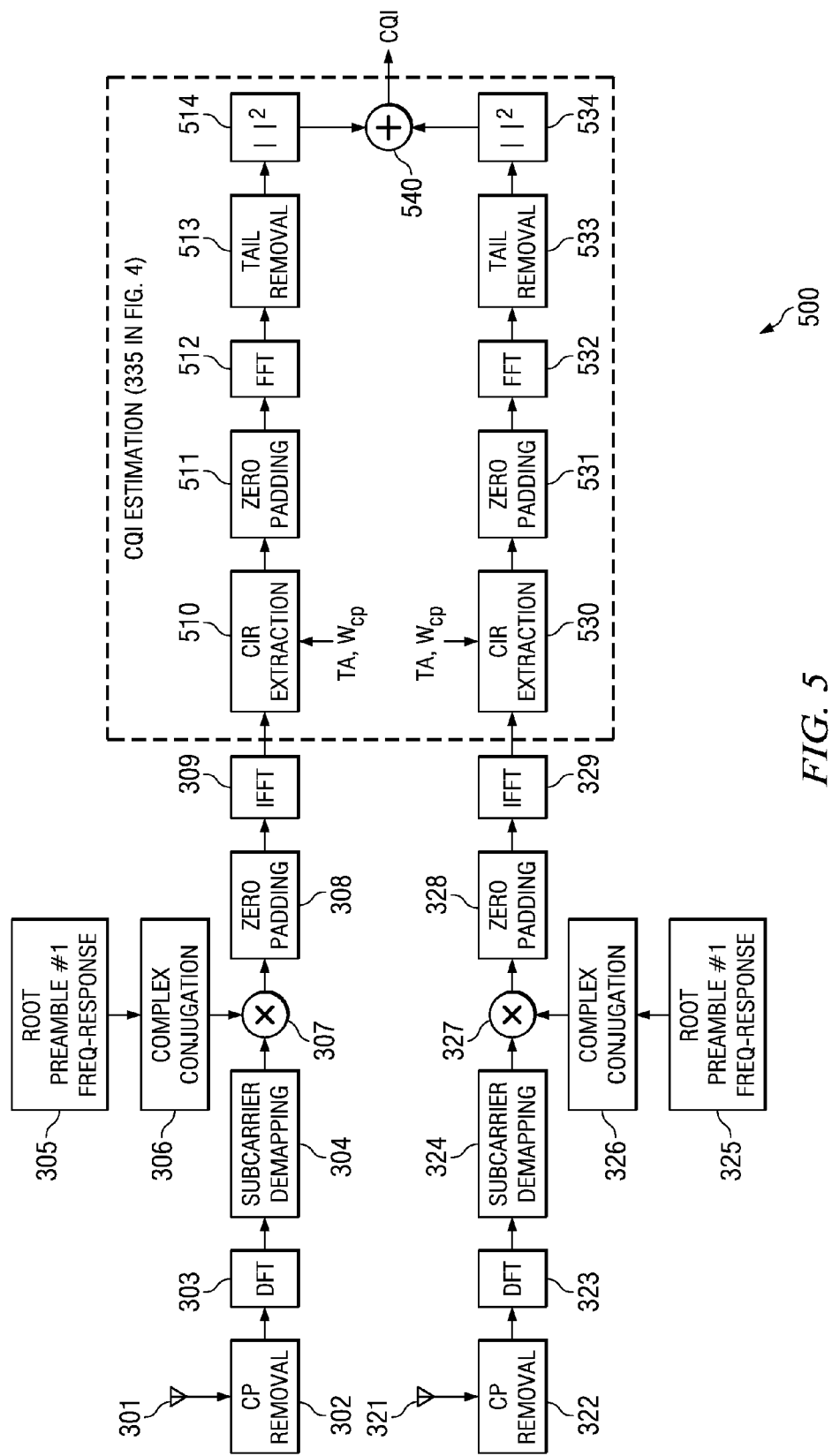
FIG. 5 illustrates a block diagram of an exemplary implementation of a CQI detector with two root preambles of this invention.

FIG. 4 illustrates a TA estimate at the largest peak delay within a sliding window. For a detected signature, the corresponding UE timing advance (TA) estimate is set as the highest peak delay within the sliding window (such as windows 401 and 402) which contains the largest energy above preamble detection threshold 421. Alternatively, TA estimate can be set to the start of the sliding window which contains the largest energy above preamble detection threshold 421. For each detected signature, the channel quality information (CQI) of transmitting UE can be estimated from the received preamble. FIG. 5 shows a method of CQI estimation based on such detected signatures.

FIG. 5 illustrates a CQI detector with two root preambles of this invention. Many of the parts of FIG. 5 are duplicates of parts in FIG. 3. These will be indicated by identical reference numbers. The radio frequency signal is received via two antennas 301, 321. After cyclic prefix (CP) removal (302, 322), a discrete Fourier transform (DFT) (303, 323) of size either the entire preamble length or its constituent sequence length is performed depending on whether coherent or non-coherent accumulation is used. A sub-carrier de-mapper (304, 324) extracts the sub-carriers used by preambles in frequency domain. In the frequency-domain implementation, one preamble detector can be used to detect all signatures based on one root preamble sequence.

At Node B, the received signal is correlated with all available root preamble sequences to detect UE access requests. Each available root preamble sequence includes a corresponding root preamble frequency response (305, 325). Each root preamble sequence is subject to a complex conjugation (306, 326). Plural multiplier 308 and 328 multiply subcarrier-by-subcarrier the results of the subcarrier demapping (304, 324) with the complex conjugation (307, 327) of the root preamble frequency response (305, 325).

The signals are subject to zero-padding (308, 328) as in FIG. 3 and then inverse fast Fourier transform (309, 329). The detected UE channel impulse response (CIR) at each receive antenna (301, 321) is extracted out in time domain using the preamble detecting sliding window which contains the largest energy (blocks 510, 530) above the preamble detection threshold 421. To do this, information such as the length of sliding window and its start point (or TA if TA is set at the start of sliding window) must be used, with the latter obtained from peak search step. Since only one CQI value on each preamble frequency resource block is of interest and 6 resource blocks are used for preamble transmission, a second stage of zero padding (511, 531) is used in time domain so that 6 interpolated CQI values over approximately 6 resource blocks are obtained after tail removal.

Fast Fourier transform blocks 512 and 532 transform the signals into the frequency domain. The tail removal (513, 533) is used to drop the padding zeros in frequency domain. For a preamble sequence length of 839 in 800 μs and an IFFT size of 1024, an FFT size of 8 can be used to obtain 6 CQI samples in frequency domain after dropping 2 tail samples. The UE CQI is the amplitude squares (514, 535) of frequency domain CIRs summed (540) over multiple receive antennas as shown in FIG. 5.

What is claimed is:

1. A method of preamble detection in a random access channel of a wireless transmission system comprising the steps of:
receiving a transmitted signal;
converting the received signal into frequency-domain samples via a discrete Fourier transform;
demodulating a group of said frequency-domain samples to produce samples of the received signal;
converting said samples of demodulated signal into time-domain samples using an inverse fast Fourier transform;
modifying the time-domain samples to produce modified time-domain samples;
summing a group of modified time-time domain samples to produce a sum signal;
comparing the sum signal against a pre-computed preamble detection threshold calculated as follows $$T_{det} = \frac{T_r}{AN_{nca}} \cdot \gamma_n$$

where: $T_{det}$ and $T_r/AN_{nca}$ are the respective absolute and relative preamble detection thresholds; A is the number of receive antennas; $N_{nca}$ is the number of non-coherent accumulations; and $\gamma_n$ is the noise floor estimate; and
detecting a preamble in the random access channel if the sum signal exceeds the pre-computed preamble detection threshold.

2. A method of preamble detection in a random access channel of a wireless transmission system comprising the steps of:
receiving a transmitted signal;
converting the received signal into a frequency domain samples via a discrete Fourier transform;
demodulating a group of said frequency-domain samples to produce samples of a demodulated signal by multiplying each frequency-domain sample by a complex number, each complex number being a complex-conjugate of a root preamble sequence selected from a set of all possible root preamble sequences;
converting said samples of demodulated signal into time-domain samples using an inverse fast Fourier transform;
modifying the time-domain samples to produce modified time-domain samples;

summing a group of modified time-time domain samples to produce a sum signal;
comparing the sum signal against a pre-computed preamble detection threshold;
detecting a preamble in the random access channel if the sum signal exceeds the pre-computed preamble detection threshold.

3. A method of preamble detection in a random access channel of a wireless transmission system comprising the step of:
receiving a transmitted signal;
converting the received signal into frequency domain samples via a discrete Fourier transform;
demodulating a group of said frequency-domain samples to produce samples of a demodulated signal;
converting said samples of demodulated signal into time-domain samples using an inverse fast Fourier transform;
modifying the time-domain samples to produce modified time-domain samples;
summing a group of modified time-time domain samples to produce a sum signal;
comparing the sum signal against a pre-computed preamble detection threshold;
detecting a preamble in the random access channel if the sum signal exceeds the pre-computed preamble detection threshold; and
calculating a channel quality information (CQI) by
detecting a channel impulse response (CIR) from the modified time-domain samples,
converting the detected channel impulse response into frequency-domain samples using an inverse fast Fourier transform, and
summing the frequency-domain samples over plural receive antennas.

4. The method of claim 3, wherein:
said step of detecting a channel impulse response (CIR) employs a preamble detecting sliding window which contains a largest energy above a preamble detection threshold.

5. The method of claim 4, wherein:
said step of detecting a channel impulse response (CIR) employs a timing advance (TA) estimate set to a highest peak delay within the sliding window which contains the largest energy above a preamble detection threshold.

6. The method of claim 4, wherein:
said step of detecting a channel impulse response (CIR) employs a timing advance (TA) estimate set to the start of the sliding window which contains the largest energy above preamble detection threshold.

7. The method of claim 4, wherein:
said step of calculating a channel quality information (CQI) further includes modifying time-domain samples by computing a square of a magnitude for each time-domain sample.

8. The method of claim 4, wherein:
said step of calculating a channel quality information (CQI) further includes tail removal of said time-domain samples.

9. An apparatus for random access preamble detection in a wireless communication system, comprising:
a receiver antenna;
a discrete Fourier transform connected to the receiver antenna for converting a received signal into frequency-domain samples;
a plurality of root preamble frequency response units generating respective preamble frequency responses corresponding to all available root preamble sequences of user equipment seeking access;
a plurality of complex conjugation units, each connected to a corresponding one of said root preamble frequency response units, for forming a complex conjugate of a corresponding preamble frequency response;
a plurality of multipliers, each having a first input connected to said discrete Fourier transform, a second input connected to a corresponding complex conjugation units and a product output;
a plurality of inverse fast Fourier transforms, each connected to a corresponding multiplier for converting said products into time-domain samples;
a plurality of magnitude square units, each connected to a corresponding inverse fast Fourier transform forming a square of a magnitude for each time-domain sample;
a summer having inputs connected to each magnitude square unit for summing said square of a magnitudes; and
a comparator connected to said summer for comparing a sum signal from the summer with a preamble detection threshold and generating a detection signal if said sum signal exceeds said preamble detection threshold.

10. The apparatus of claim 9, wherein:
said comparator includes a window filter.

11. The apparatus of claim 10, wherein:
said window filter has a time-duration less than or equal to a time duration of a cyclic prefix (CP) of said received signal.

12. The apparatus of claim 9, further comprising:
a channel quality information (CQI) unit including
a channel impulse response (CIR) unit connected to a corresponding inverse discrete Fourier transform for calculating a channel impulse response,
an inverse discrete Fourier transform connected to a corresponding channel impulse response converting the detected channel impulse response into time-domain samples, and
a summer connected to said inverse discrete Fourier transforms summing the time-domain samples thereby generating a channel quality information (CQI) signal.

13. The apparatus of claim 9, wherein: said comparator includes
a noise floor estimator receiving a false alarm rate, a number of receive antennas, a number of non-coherent accumulations and the summed data from summer forming an estimate of a noise floor in received signals on plural channels,
a peak search unit receiving said sum signal and said noise estimate and setting said preamble detection threshold.

* * * * *